(12) United States Patent
Kudva et al.

(10) Patent No.: US 9,354,769 B1
(45) Date of Patent: May 31, 2016

(54) ELECTRONICALLY CONTROLLING COMMITMENT OF A CHANGE TO STORED INFORMATION

(75) Inventors: Santhosh V. Kudva, Karnataka (IN); Michael E. Bappe, Loveland, CO (US); Helen S. Raizen, Jamaica Plain, MA (US); Thomas W. Bennett, Nashua, NH (US)

(73) Assignee: EMC Corporation, Hopkinton, MA (US)

( * ) Notice: Subject to any disclaimer, the term of this patent is extended or adjusted under 35 U.S.C. 154(b) by 1067 days.

(21) Appl. No.: 13/077,175

(22) Filed: Mar. 31, 2011

(51) Int. Cl.
*G06F 3/0481* (2013.01)
*H04L 12/18* (2006.01)

(52) U.S. Cl.
CPC .......... *G06F 3/0481* (2013.01); *H04L 12/1822* (2013.01)

(58) Field of Classification Search
CPC .... G06F 3/0481; G06F 3/023; H04L 12/1822
USPC ................. 715/751–756, 758–759, 761–763, 715/748–749; 707/108; 719/314; 717/101, 717/106
See application file for complete search history.

(56) References Cited

U.S. PATENT DOCUMENTS

| | | | | |
|---|---|---|---|---|
| 5,706,452 | A * | 1/1998 | Ivanov | 715/751 |
| 7,152,220 | B2 * | 12/2006 | Rickards, III | G06F 8/71 717/101 |
| 7,467,198 | B2 | 12/2008 | Goodman et al. | |
| 7,533,034 | B2 | 5/2009 | Laurin et al. | |
| 7,950,004 | B2 * | 5/2011 | Vieira | G06F 11/3688 714/25 |
| 7,966,493 | B2 | 6/2011 | Puri et al. | |
| 8,122,425 | B2 | 2/2012 | Corral | |
| 8,332,906 | B2 * | 12/2012 | Roberts | G06F 21/31 709/203 |
| 8,510,181 | B2 | 8/2013 | Creedle et al. | |
| 8,548,868 | B1 | 10/2013 | Lawrence | |
| 8,561,036 | B1 * | 10/2013 | Beans et al. | 717/140 |
| 8,631,386 | B2 * | 1/2014 | Doshi | 717/106 |
| 2003/0106039 | A1 * | 6/2003 | Rosnow et al. | 717/100 |
| 2004/0107125 | A1 * | 6/2004 | Guheen et al. | 705/7 |
| 2005/0076215 | A1 * | 4/2005 | Dryer | 713/170 |
| 2006/0064315 | A1 * | 3/2006 | Koch et al. | 705/1 |
| 2006/0259524 | A1 * | 11/2006 | Horton | 707/201 |
| 2007/0128899 | A1 * | 6/2007 | Mayer | G06F 9/4406 439/152 |
| 2007/0294179 | A1 * | 12/2007 | Krawetz | 705/59 |
| 2008/0127151 | A1 * | 5/2008 | Kawahito | G06F 8/443 717/159 |
| 2008/0228580 | A1 * | 9/2008 | Korman et al. | 705/14 |
| 2008/0295085 | A1 * | 11/2008 | Rachamadugu et al. | 717/159 |
| 2009/0112575 | A1 * | 4/2009 | Sakashita et al. | 704/8 |
| 2009/0112577 | A1 * | 4/2009 | Gifford et al. | 704/9 |

(Continued)

*Primary Examiner* — Steven Sax
(74) *Attorney, Agent, or Firm* — BainwoodHuang

(57) ABSTRACT

A technique electronically controls commitment of a change to stored information. The technique involves accessing a reviewer database to ascertain a set of reviewers assigned to review proposed changes to the stored information. The technique further involves electronically notifying the set of reviewers to review a particular proposed change to the stored information after the set of reviewers is ascertained. Each reviewer is able to electronically approve or reject the particular proposed change to the stored information. The technique further involves (i) electronically preventing commitment of the particular proposed change to the stored information while less than a predefined number of electronic approvals has been received from the set of reviewers and (ii) electronically enabling commitment of the particular proposed change to the stored information upon receipt of the predefined number of electronic approvals from the set of reviewers.

24 Claims, 5 Drawing Sheets

(56) References Cited

U.S. PATENT DOCUMENTS

| | | | |
|---|---|---|---|
| 2009/0113445 A1* | 4/2009 | Sakashita et al. | 719/313 |
| 2009/0138851 A1* | 5/2009 | Allen et al. | 717/122 |
| 2010/0131859 A1* | 5/2010 | Ferris | G06Q 10/10 715/751 |
| 2010/0138745 A1* | 6/2010 | McNamara et al. | 715/720 |
| 2010/0242028 A1* | 9/2010 | Weigert | 717/131 |
| 2011/0088009 A1* | 4/2011 | Jones | G06F 9/4446 717/100 |
| 2011/0307860 A1* | 12/2011 | Park et al. | 717/107 |

* cited by examiner

ELECTRONICALLY CONTROLLING COMMITMENT OF A CHANGE TO STORED INFORMATION

BACKGROUND

A conventional software development system provides a framework within which software developers can create and maintain a software application. For example, such a system typically enables multiple software developers to write and store source code of the software application, as well as manage, build and test different versions of the application based on that source code.

Along these lines, suppose that a software developer wishes to modify existing source code which resides in a particular file. Perhaps the software developer wishes to implement an enhancement to the application or fix a software bug. To modify the existing source code, the software developer typically exports or "checks out" a local copy of the particular file from the system and edits the source code in the local copy, e.g., on a software development workstation. Once the software developer finishes modifying the source code in the local copy, the software developer commits or "checks in" the modified source code into the system and the system responds by safely and reliably writing the modified source code back into the system.

Some conventional software development systems are equipped with a feature which enables software developers to inform each other when modified source code has been committed. In such a system, after the software developer commits modified source code back into the system, the system automatically informs the other software developers that the modified source code has been committed.

SUMMARY

Unfortunately, there are deficiencies to the above-described conventional software development system which automatically informs other software developers after modified source code has been committed. For example, the above-described conventional software development system does not provide any notice to the other software developers prior to software developers prior to commitment of the modified source code. That is, once the software developer commits the modified source code, it is too late for the other software developers to provide input and perhaps influence how the source code should have been modified. Nevertheless, in some situations, a review performed by the other software developers and/or a suggestion from another software developer as to how the source code should be modified could otherwise provide certain advantages. For instance, a review of the modified source code prior to commitment by another software developer could identify a bug in the modified source code and/or could result in discovery of a newly created problem which otherwise would not be discovered until after commitment of the modified source code.

In contrast to the above-described conventional software development system which automatically informs other software developers after modified source code has been committed, an improved technique involves electronically controlling commitment of a proposed change to stored information based on electronic approvals from a set of reviewers. Such a technique enables the set of reviewers (e.g., who are ascertained using a reviewer database) to approve or reject the proposed change prior to commitment of the proposed change. Accordingly, other reviewers now have opportunities to flag problems prior to commitment or perhaps even discover new issues which warrant further investigation prior to commitment. Such a technique is well suited for use as part of, or in combination with, a software development platform as well as other electronic systems.

One embodiment is directed to a method of electronically controlling commitment of a change to stored information. The method includes accessing a reviewer database to ascertain a set of reviewers assigned to review proposed changes to the stored information. The method further includes electronically notifying the set of reviewers to review a particular proposed change to the stored information after the set of reviewers is ascertained. Each reviewer is able to electronically approve or reject the particular proposed change to the stored information. The method further includes (i) electronically preventing commitment of the particular proposed change to the stored information while less than a predefined number of electronic approvals has been received from the set of reviewers and (ii) electronically enabling commitment of the particular proposed change to the stored information upon receipt of the predefined number of electronic approvals from the set of reviewers (e.g., when a quorum is reached).

Another embodiment is directed to an electronic system which electronically controls commitment of a change to stored information. Another embodiment is directed to a computer program product for electronically controlling commitment of a change to stored information. Other embodiments are directed to apparatus, processes, articles of manufacturer, and so on.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves electronically controlling commitment of a proposed modification to stored information based on electronic approvals from a set of reviewers (i.e., one or more reviewers). Such a technique enables each reviewer to approve or reject the proposed modification prior to commitment of the proposed modification, and commitment occurs only upon receipt of appropriate approval. As a result, reviewers are able to flag problems prior to commitment or perhaps even discover potential newly created issues which warrant further investigation prior to commitment. Such a technique is well suited for use as part of, or in combination with, a software development platform as well as other kinds of electronic systems.

Figure 1:
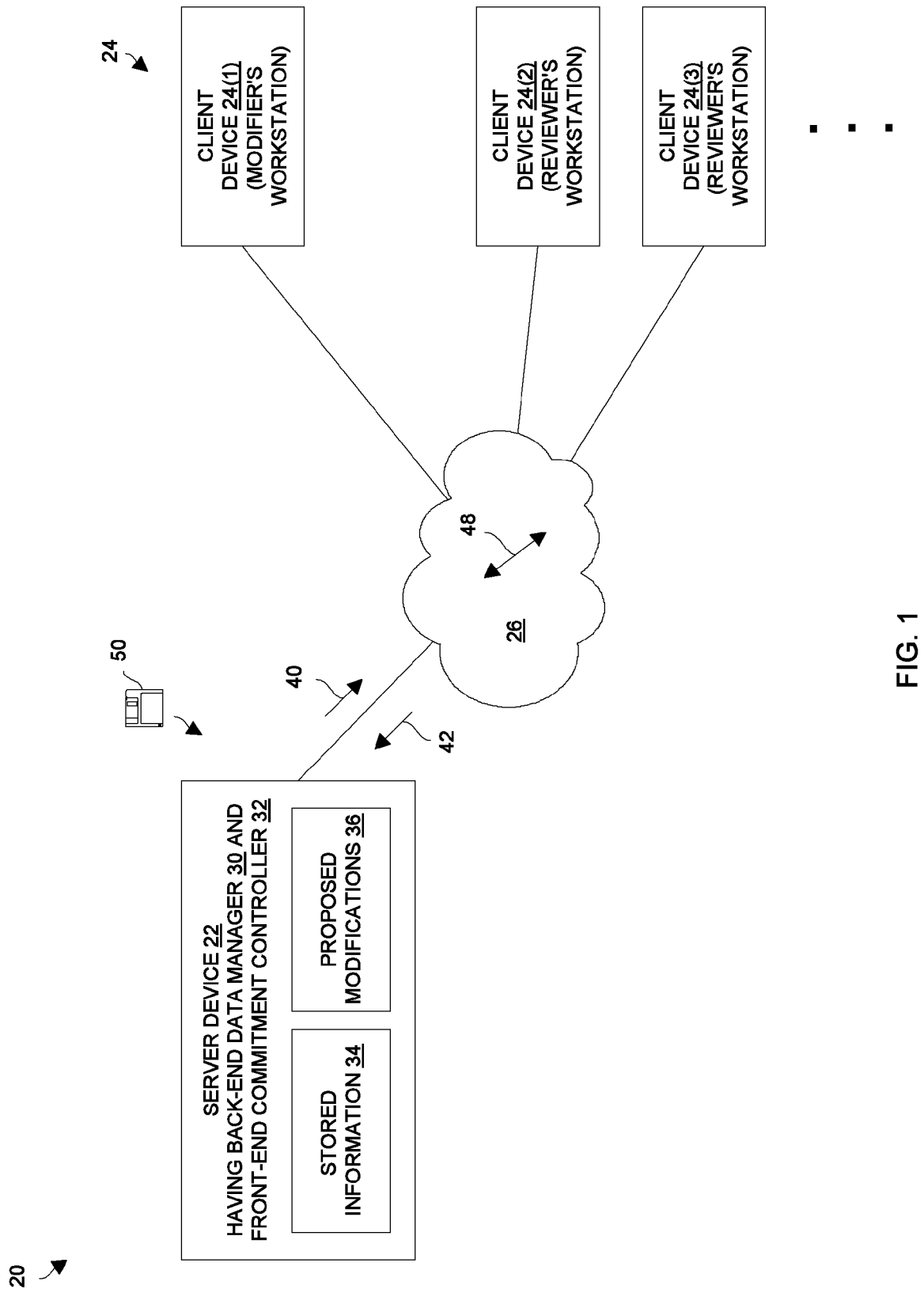
FIG. 1 is a block diagram of an electronic system which electronically controls commitment of a proposed change to stored information.

FIG. 1 shows an electronic system 20 which electronically controls commitment of a proposed modification to stored information. The electronic system 20 includes a server device 22, multiple client devices 24(1), 24(2), 24(3), . . . (collectively, client devices 24), and a communications medium 26. By way of example only, some of the details below will be provided in the context of a software development platform. Nevertheless, it should be understood that the electronic system 20 is suitable for use in other types of applications which involve coordinating a proposed modification among multiple users.

As shown in FIG. 1, the server device 22 includes a back-end data manager 30 and a front-end commitment controller 32. The back-end data manager 30 is constructed and arranged to store information 34 (e.g., electronic data). The stored information 34 may exist as separate data elements (e.g., a collection of files) which together form a body of work or perhaps form different versions of the body of work. For example, in the context of a software development platform, the stored information 34 may include files which are suitable for building different versions of a software application, an operating system, parts of an operating system, and so on.

The front-end commitment controller 32 of the server device 22 is constructed and arranged to control commitment of proposed modifications 36 to the stored information 34. For example, a user is able to save a proposed modification (or change) 36 on the server device 22, and then activate the front-end commitment controller 32 to initiate a review process prior to commitment of the proposed change 36. In response to such activation, the front-end commitment controller 32 sends a set of review notifications 40 to a set of reviewers and awaits a set of replies 42 from the set of reviewers. At this point, the reviewers are able to access and evaluate the proposed change 36 on the server device 22. Each reply 42 may include approval (i.e., acceptance) of the proposed change 36 or perhaps other input (e.g., an expressed comment or concern, a question, a proposal for an alternative change, and so on). The front-end commitment controller 32 allows commitment of the change 36 upon receipt of a predefined number of reviewer approvals, and perhaps satisfaction of other requirements such as electronic approval from one or more designated people. In the meantime, the front-end commitment controller 32 does not permit commitment of the change 36.

The client devices 24 (e.g., computerized workstations) are constructed and arranged to access the server device 22 for a variety of purposes. For example, a user on each client device 24 is capable of submitting a proposed change 36 to the stored information 34 and activating the front-end commitment controller 32 on the server device 22 to have the proposed change 36 reviewed (e.g., see the client device 24(1)). Additionally, users on other client devices 24 are able to receive review notifications 40 from the server device 22, evaluate the proposed change 36, and return replies 42 approving/rejecting the proposed change 36 (e.g., see the client devices 24(2), 24(3)). In the context of a software development platform, users of the client devices 24 are thus able to effectively develop and build software applications using the server device 22 as a source code review and analysis platform as well as a formal repository for the source code and executables, among other things.

The communications medium 26 is constructed and arranged to convey communications 48 (i.e., electronic signals such as the notifications 40 and replies 42) between the server device 22 and the client devices 24. The communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based devices and cabling, fiber optic devices and cabling, wireless devices, combinations thereof, and so on. Moreover, some portions of the communications medium 26 may include a computer network (e.g., the Internet, a LAN, a VPN, etc.) while other portions may include a different type of network (e.g., SAN hardware, etc.).

During operation of the electronic system 20, users working on the client devices 24 are able to reliably access and make use of the stored information 34 via the back-end data manager 30 of the server device 22 (e.g., to develop a software application). Furthermore, the front-end commitment controller 32 imposes discipline and structure to the process of making changes to the stored information 34 thus safeguarding the integrity of the stored information 34 but nevertheless enabling the users to coordinate their efforts at the same time.

It should be understood that the proposed change 36 may take a variety of different forms. For example, in the context of a software development platform, the user is able to initially create a remote working copy of at least some of the stored information 24 on a client device 24 (e.g., client device 24(1)). The user then modifies the contents of the remote working copy (e.g., edits source code in a file, etc.). When the user is finished modifying the remote working copy and is then ready to enter the proposed modification 36 back into the server device 22, the user uploads the working copy back onto the server device 22 and invokes the front-end commitment controller 32 which notifies a set of reviewers assigned to review and potentially approve the proposed modification 36 within the working copy for commitment. Preferably, the front-end commitment controller 32 sends each reviewer a separate notification message 40 indicating that the proposed modification 36 is ready for review (e.g., see client devices 24(2) and 24(3)).

In response to the notification messages 40, the reviewers study the proposed modification 36 within the working copy and either approve or reject the proposed modification 36. With the proposed modification 36 residing on the server device 22, the reviewers are able to conveniently view and analyze the proposed modification 36 prior to to commitment. There is no need for the user to manually circulate the proposed change 36 in an ad hoc manner (i.e., in a manner which may be uncontrolled or poorly managed). Advantageously, the front-end commitment controller 32 does not allow commitment of the modified copy until the server device 22 receives, in the replies 42, the predefined number of electronic approvals (e.g., a quorum). As a result, the reviewers are able to identify bugs, make suggestions for alternative modifications, and discover new problems prior to commitment of the proposed modification 36.

As an alternative to receiving a modified working copy (e.g., a revised file) from a client device 24, it should be understood that the server device 22 is also able to receive proposed changes 36 directly from the client devices 24. In particular, the server device 22 is able to create a local working copy of at least part of the stored information 34 and allow a user (e.g., on client device 24(1)) to modify the local working copy without requiring the user to provide storage for the working copy at the user's client device 24. After the user is finished making changes to the working copy on the server device 22, the user then directs the front-end commitment controller 32 to send out review notifications 40 to the other users (e.g., see client devices 24(2), 24(3)). Again, the server device 22 treats the modification in the local working copy as a proposed modification 36 and does not formally enter the proposed modification 36 until it receives, in the replies 42, the proper approvals.

In some arrangements, the front-end commitment controller 32 is implemented by a computer program product 50 which provides a set of instructions (e.g., executable code). In particular, the computer program product 50 includes a non-transitory computer readable storage medium that stores a set of instructions which, when run by a computer, cause the computer to operate as the front-end commitment controller 32 and perhaps other portions of the server device 22. Suitable forms for such a non-transitory computer readable storage medium which delivers such a set of instructions in a non-volatile manner include CD-ROMs, DVDs, disk memory, tape memory, flash memory, and the like. Further details will now be provided with reference to FIG. 2.

Figure 2:
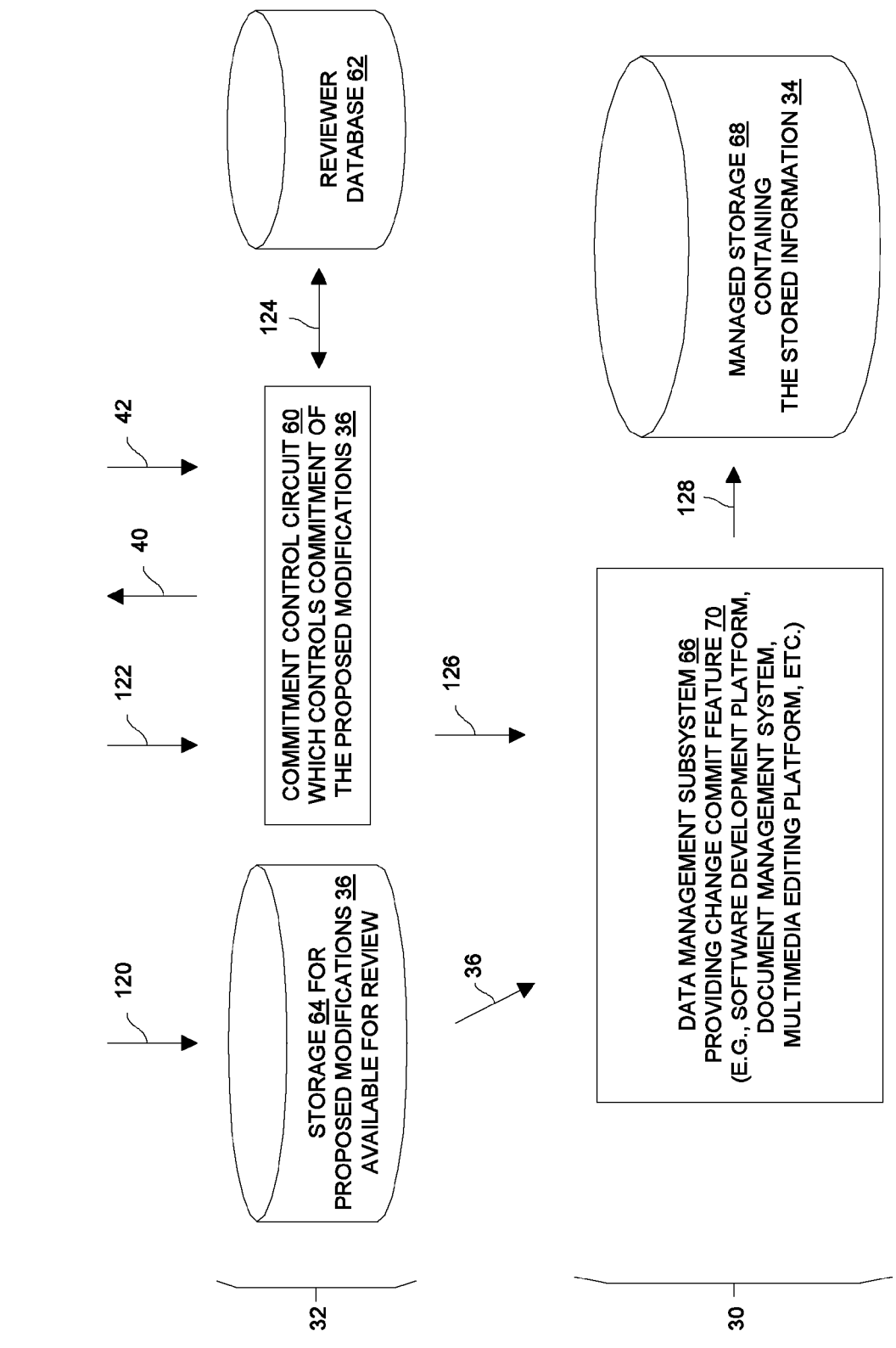
FIG. 2 is a block diagram of particular parts of an electronic server of the electronic system which participate in the commitment process.

FIG. 2 shows particular details of the server device 22 which are involved in effectuating a change to the stored information 34. As shown in FIG. 2, the front-end commitment controller 32 includes a commitment control circuit 60, a reviewer database 62, and storage 64 to store proposed modifications 36 which are available for review. The commitment control circuit 60 may provide a web browser interface to enable the users to access the commitment control circuit 60 via web browsers. In some arrangements, the commitment control circuit 60 is formed by a network interface and a set of processors running the set of instructions delivered by the computer program product 50 (FIG. 1). In other arrangements, the commitment control circuit 60 is formed by specialized hardware. Other arrangements are suitable as well.

The reviewer database 62 identifies the various data elements (e.g., files, portions of files, etc.) of the stored information 34. For each data element, the reviewer database 62 includes particular items of information which the front-end commitment controller 32 uses to (i) identify particular reviewers who are authorized to approve changes 36 to that data element, as well as (ii) track the number of approvals received for a proposed modification 36 to that data element. The commitment control circuit 60 manages the reviewer database 62 and does not allow commitment of any proposed change 36 to a particular data element until the approval requirements for proposed changes 36 to that data element are satisfied.

As further shown in FIG. 2, the back-end data manager 30 includes a data management subsystem 66 and managed storage 68 for reliably maintaining the stored information 34. The managed storage 68 may include a data storage system (e.g., a single disk drive, a disk assembly, a storage array, etc.) having certain fault tolerance and high availability features (e.g., backups, redundancy, etc.). In some arrangements, the same data storage system which manages the stored information 34 may further provide the storage 64 for proposed modifications 36 as well as for the reviewer database 62. The data management subsystem 66 preferably provides a change commit feature 70 which commits changes to the stored information 34. This change commit feature 70 is under control of the commitment control circuit 60 of the front-end commitment controller 32. Before Before walking through the various exchanges that occur between the parts of the server device 22 illustrated in FIG. 2, a further description of the reviewer database 62 will be provided.

Figure 3:
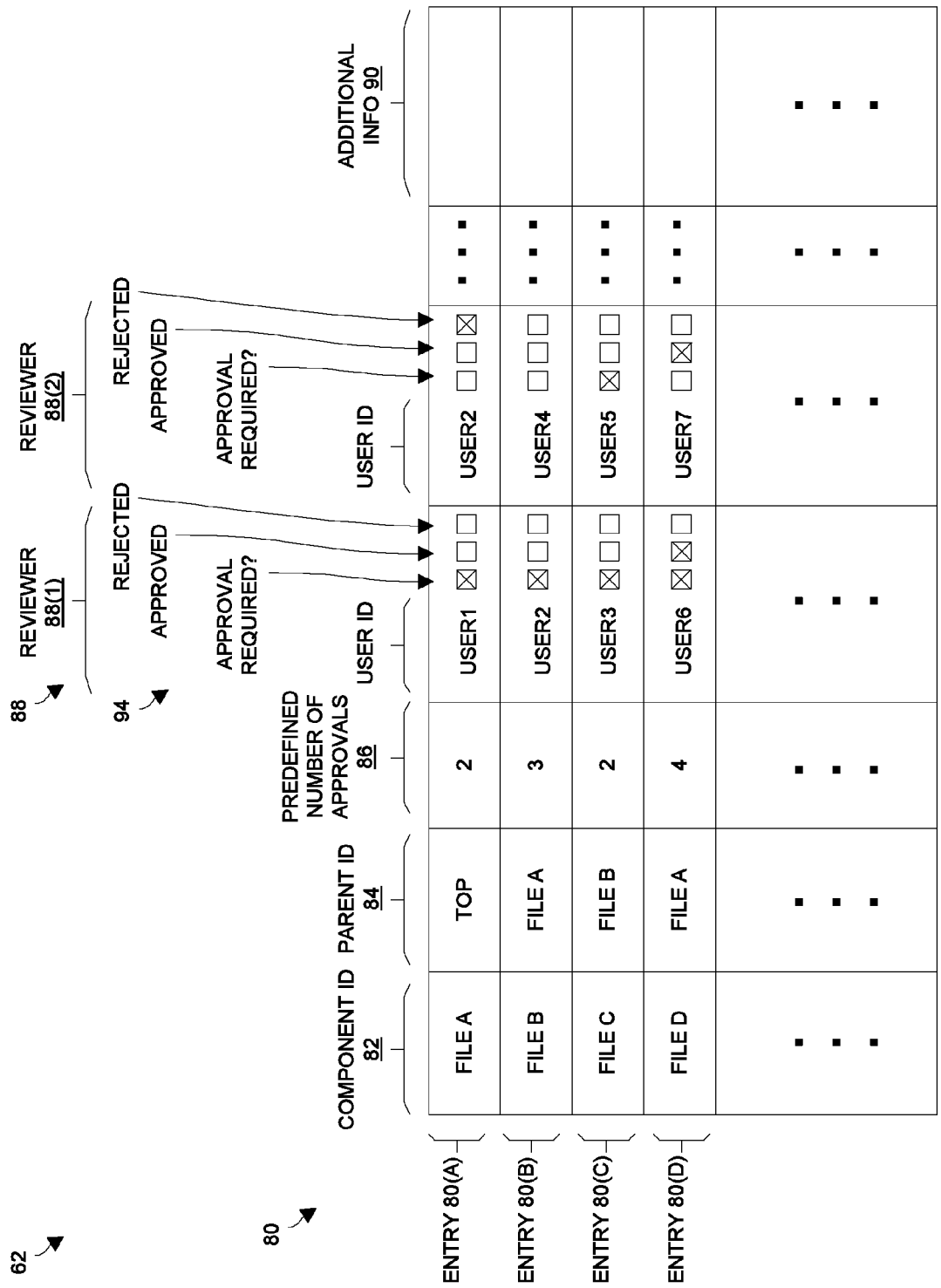
FIG. 3 is an example of entries in a reviewer database of FIG. 2.
Figure 4:
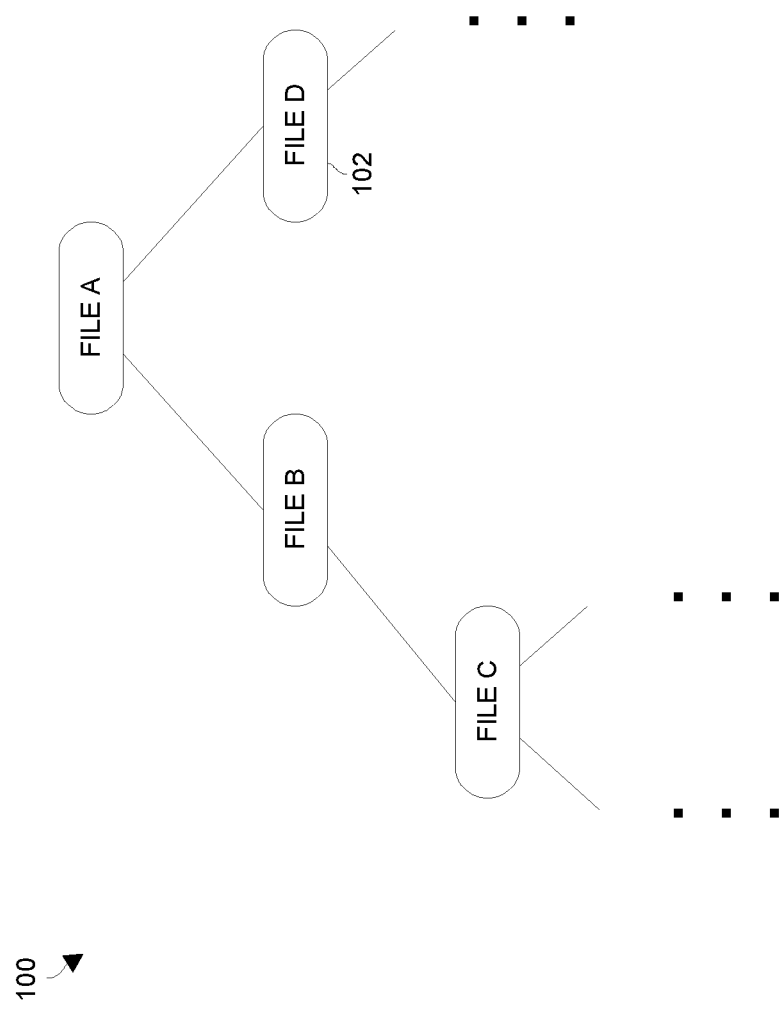
FIG. 4 is an example hierarchy which is represented by the example entries of the reviewer database of FIG. 3.

FIGS. 3 and 4 show further details of the reviewer database 62. In particular, FIG. 3 shows entries 80(A), 80(B), 80(C), 80(D), . . . (collectively entries 80) of the reviewer database 62, and FIG. 4 shows a hierarchical diagram 100 of data elements 102 which is defined by the entries 80. The commitment control circuit 60 updates the reviewer database 62 each time a new data element 102 is added to the stored information 34, and each time a user invokes the review process in order to commit a proposed change 36 to the stored information 34.

As shown in FIG. 3, each entry 80 includes a component identifier (ID) field 82, a parent ID field 84, a predefined number of approvals field 86, a set of reviewer fields 88(1), 88(2), . . . (collectively, reviewer fields 88), and additional fields 90. Each reviewer field 88 includes a variety of subfields 94 such as a user ID field, and requirement fields 94. At an initial time and as the stored information 34 grows, an administrator (or automated process) adds new entries 80 to the reviewer database 62 and pre-populates at least some of the fields of the new entries 80 with appropriate data. The remaining fields of the new entries 80 are then populated during further operation of the electronic system 20. A more-detailed description of the format for each entry 80 will now be provided.

For each entry 80, the contents of the component ID field 82 identify a particular data element of the stored information 34 (i.e., a component ID). In the context of a software development platform, the component ID may be a filename of a particular file which forms part of a particular version of an application. Along these lines, when a file is initially added as part of the application or a version of the application, an administrator preferably creates an entry 80 identifying that file (e.g., by filename, pathname, combinations thereof, etc.) in the reviewer database 62. By way of example, the contents of the component ID field 82 of entry 80(B) identifies an electronic file of the stored information 34 named FILE B.

The contents of the parent ID field 84 of each entry 80 identify a data element of the stored information which is deemed a parent to the data element identified by the contents of the component ID field 82. As a result, a hierarchical relationship between the two data elements is defined. In the context of the above-described software development platform, the contents of the parent ID field 84 of entry 80(B) indicates that FILE B has FILE A as its parent. This relationship is illustrated graphically in FIG. 4. In some arrangements, a software development system (e.g., see the data management system 66 in FIG. 2) establishes this hierarchy and the commitment control circuit 60 is capable of extracting the relationship input directly from the software development system. It will be explained shortly that this dependency relationship enables a certain level of inheritance to exist.

The contents of the predefined number of approvals field 86 of each entry 80 indicates the predefined number of approvals required before the front-end commitment controller 32 (FIG. 2) allows commitment of any proposed change 36 to the data element identified in the component ID field 82 of that entry 80. In some arrangements, the predefined number of approvals must be at least two to ensure a disciplined, structured approach to the change review process. Here, a quorum of at least two approvals from reviewers is necessary before effectuating a change to the stored information. Of course, other numbers can be used depending on the particular situation (e.g., at least one reviewer approval, at least three reviewer approvals, and so on). In the context of the above-described software development platform, any proposed change 36 to FILE B requires at least three (3) reviewer approvals before the proposed change 36 can be committed.

The reviewer fields 88 of each entry 80 correspond to a set of users who are assigned to review any proposed changes 36 to the data element corresponding to that entry 80 and thus form a reviewer list for that data element. In particular, each reviewer field 88 includes a user ID subfield which identifies a particular user assigned to review proposed changes 36, a setting indicating whether approval from that user is a required prior to commitment, and approval/rejection input from that user. Preferably, each data element 80 element 80 is assigned at least one required reviewer (i.e., a primary user of authority) having primary responsibility for proposed changes 36 to that data element 80. In the context of the above-described software development platform, USER2 and USER4 (perhaps among others) are assigned to review proposed changes 36 to FILE B, and approval from USER2 is required (a control box is checked or a control bit is set) before commitment of any proposed changes 36 to FILE B.

In some arrangements, user email addresses are suitable for use as the user IDs. Here, each user email address not only uniquely identifies a user, but also identifies a particular vehicle for communicating with that user. Alternative approaches for identifying users are suitable for use as well such as client device IDs, user login IDs, character strings, combinations thereof, and so on.

The contents of the additional info field 90 of each entry 80 is constructed and arranged to store additional information about the corresponding data element 102 (e.g., subfields for comments, descriptions, etc.). If a proposed change 36 has been submitted for review by a user, the additional info field 90 may include the user ID of that user and a short description of the proposed change 36. The additional info field 90 may further include input from particular reviewers, timestamps of proposed change submissions and associated communications, a review and/or revision history, a list of child data elements 102, and so on.

It should be understood that the entries 80 of the reviewer database 62 are constructed and arranged to depict a set of dependency relationships regarding how the stored information 34 is organized in the managed storage 68 by the data management subsystem 66 (also see FIG. 2). In particular, as shown in FIG. 4, the data elements 102 have parent/child relationships with other data elements 102 thus providing a file hierarchy in the form of an inverted tree. In the context of the above-described software development platform, FILE B and FILE D depend from FILE A. Additionally, FILE C depends from FILE B, and so on.

It should be understood that there may be multiple versions of each data element 102 (e.g., many different versions of a file for software development purposes), and that the reviewer database 62 is capable of tracking such versions. However, a single version of each data element is illustrated in FIG. 4 for simplicity.

In some arrangements, the existing hierarchical relationships are referenced for inheritance purposes when creating additional entries 80 in the reviewer database 62. For example, suppose that an administrator wishes to add a new data element 102, i.e., FILE E, as a child to FILE D. When the administrator creates a new entry 80, the administrator indicates that the new entry 80 corresponds to FILE E and that FILE E is a child of FILE D. Accordingly, the commitment control circuit 60 of the front-end commitment controller 32 automatically copies (or provides a pointer/link) to the contents of fields 86, 88 of the entry 80 for FILE D, i.e., entry 80(D), to the fields 86, 88 of the new entry 80 for FILE E. As a result, approval requirements for FILE D are inherited by FILE E (e.g., FILE E requires four (4) approvals, USER6 and USER7 are assigned as reviewers, and approval from USER 6 is required for change commitment, etc.). The administrator is then able to adjust the information in the fields for further customization.

With reference now to FIGS. 2 through 4, a walk through of the exchange between the different parts of the server device 22 during the process of making a change to the stored information 34 will now be provided. In particular, suppose that a user wishes to commit a proposed change 36 to certain source code in FILE B (also see entry 80(B) in FIG. 3). To begin the review process, the user saves the proposed change 36 in a working copy 120 of FILE B in the storage 64 (illustrated by the arrow 120 in FIG. 2). Alternatively, the proposed change 36 may take the form of a set of edit instructions, a portion of a file, a set of files, etc.

The user then sends a command 122 to the commitment control circuit 60 of the front-end commitment controller 32. The command 122 includes the user ID (e.g., an email address) of the user, the component ID which identifies FILE B, and a short description of the proposed change 36. In some arrangements, sending the command 122 includes filling out input cells of a webpage and hitting a submit button.

In response to the command 122, the commitment control circuit 60 accesses the reviewer database 62 to ascertain a set of reviewers assigned to review the proposed change 36 to the stored information 34 (see arrow 124 in FIG. 2). In the example, the commitment control circuit 60 determines that entry 80(B) corresponds to FILE B (i.e., the contents of the component ID field 82 identifies FILE B). The commitment control circuit 60 then saves the information from the command 122 in the additional info field 90 of the entry 80(B) and sends a set of notifications 40 to the set of reviewers identified by the set of reviewer fields 88 of the entry 80(B). Namely, the commitment control circuit 60 sends, as notifications 40, a separate email message to each reviewer: USER2, USER4, . . . . Each email message identifies the user, the particular data element 102 having the proposed change 36, and a short description of the proposed change 36, and so on.

The commitment control circuit 60 then awaits receipt of a set of responses 42 from the set of reviewers. In particular, each reviewer is capable of examining the proposed change 36 from the storage 64 and then returning a response 42 which accepts or rejects the proposed change 36. Of course, it is possible for a reviewer to hold off providing a response 42 rather than reject the proposed change 36 such as when the reviewer needs to communicate with the user out of band to further understand the nature of the proposed change 36 and/or explore alternative changes. Advantageously, such collaboration is made possible since the proposed change 36 has not yet been committed to the stored information 34.

While less than the predefined number of electronic approvals has been received from the set of reviewers, the commitment control circuit 60 electronically prevents commitment of the proposed change 36. As the reviewers send their responses 42 back to the commitment control circuit 60, the commitment control circuit 60 updates the entry 80(B) in the reviewer database 62. In particular, the commitment control circuit 60 fills in the subfield settings of the reviewer fields 88 and the additional info field 90 as each response 42 is collected. Additionally, each time the commitment control circuit 60 updates the entry 80(B), the commitment control circuit 60 checks to see whether the approval requirements have been satisfied.

Upon receipt of the predefined number of electronic approvals from the set of reviewers and any required approvals, the commitment control circuit 60 electronically enables commitment of the proposed change 36 to the stored information 34. Such enablement preferably takes the form of an electronic signal from the commitment control circuit 60 to the data management subsystem 66 (see arrow 126 in FIG. 2). In some arrangements, the commitment control circuit 60 sets a bit or privilege parameter which now enables commitment of the proposed change 36, e.g., unlocks a commitment feature of the data management subsystem 66. In other arrangements, the commitment control circuit 60 actually invokes a commitment feature of the data management subsystem 66 to commit the proposed change 36.

To commit the proposed change 36, the data management subsystem 66 updates the stored information 34 in the managed storage 68 based on the proposed change 36 (see arrow 128 in FIG. 2). In some arrangements, the data management subsystem 66 effectuates the change by formally storing a new version of the file (e.g., FILE B) in the managed storage 68. In the context of a software development platform, the data management subsystem 66 may commit multiple proposed changes 36 into the stored information 34 at the same time thus merging the changes as part of common entry. Further details will now be provided with reference to FIG. 5.

Figure 5:
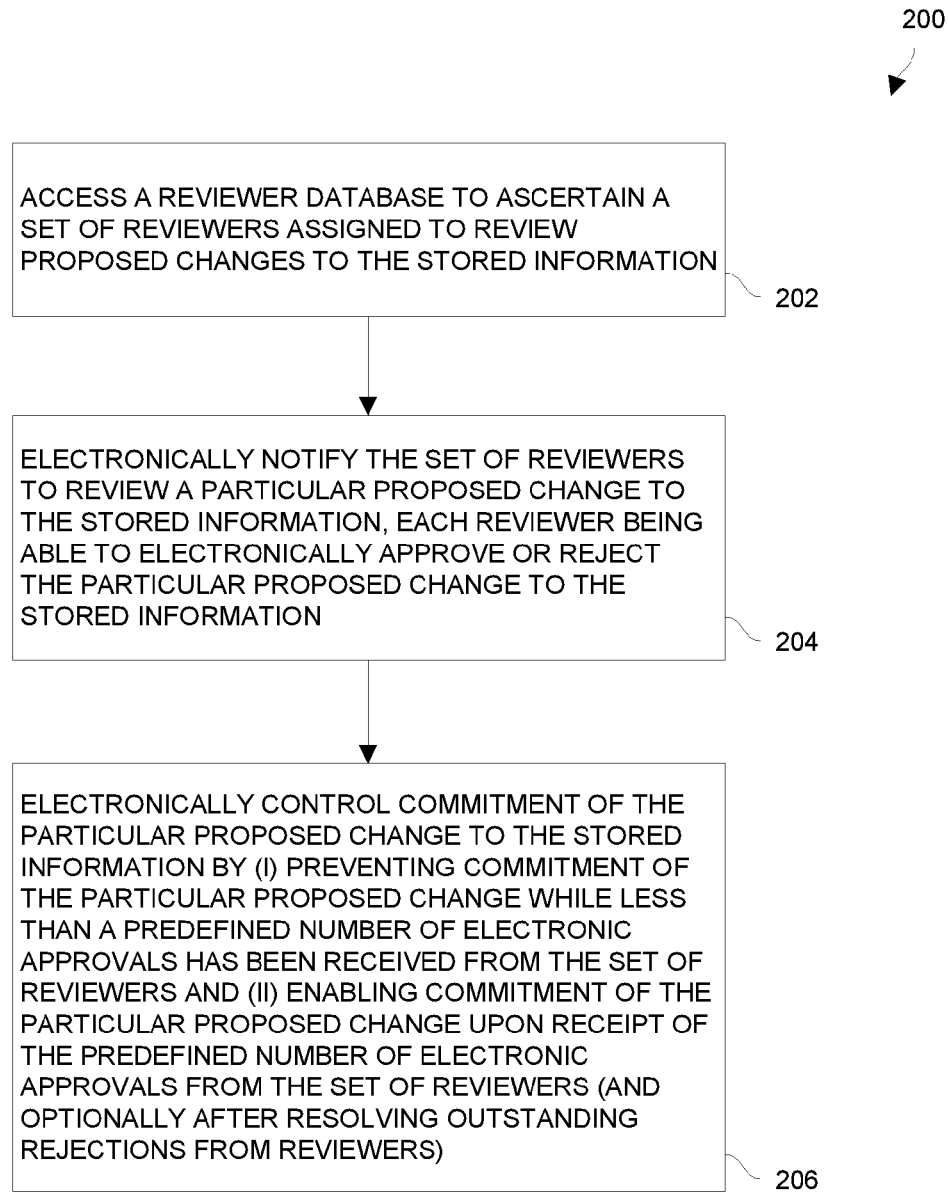
FIG. 5 is a flowchart of a procedure which is performed by the electronic server during the commitment process.

FIG. 5 is a flowchart of a procedure 200 which describes the operation of the commitment control circuit 60 (FIG. 2) when electronically controlling commitment of a proposed change 36 to the stored information 34. To invoke the procedure 200, a user uploads a proposed change 36 to the storage 64 and activates the commitment control circuit 60 (e.g., enters the command 122, also see FIG. 2).

In step 202, the commitment control circuit 60 accesses the reviewer database 62 to ascertain a set of reviewers assigned to review proposed changes 36 to the stored information 34. In particular, the commitment control circuit 60 locates the entry 80 corresponding to the data element 102 to be changed.

In step 204, after the set of reviewers is ascertained, the commitment control circuit 60 electronically notifies the set of reviewers to review the proposed change 36. Each Each reviewer is able to electronically examine the proposed change from the storage 64 and either approve or reject the particular proposed change 36 to the stored information 34.

In step 206, the commitment control circuit 60 (i) electronically prevents commitment of the particular proposed change 36 to the stored information 34 while less than a predefined number of electronic approvals has been received from the set of reviewers and (ii) electronically enables commitment of the particular proposed change 36 to the stored information 34 upon receipt of the predefined number of electronic approvals from the set of reviewers. In particular, as the reviewers provide their respective responses 42, the commitment control circuit 60 updates the entry 80 and checks whether the approval requirements for the data element have been satisfied. Once the approval requirements have been met, the commitment control circuit 60 allows commitment of the proposed change 36 by signaling the data management subsystem 66 (see arrow 126 in FIG. 2).

It should be understood that, although the procedure 200 explains that the commitment is essentially dictated by whether a predefined number of approvals has been received, other factors can be included as well. For example, based on settings in the reviewer fields 88 of the entry 80 (also see FIG. 3), the commitment control circuit 60 may require one or more approvals from specific users (i.e., defined primary owners of the data element). Approvals from other users (i.e., secondary reviewers) may be required as well in order to obtain a quorum.

As mentioned above, an improved technique involves electronically controlling commitment of a proposed change 36 to stored information 34 based on electronic approvals from a set of reviewers. Such a technique enables the set of reviewers (e.g., who are ascertained using a reviewer database 62) to approve or reject the proposed change 36 prior to commitment of the proposed change 36. Accordingly, other reviewers now have opportunities to flag problems prior to commitment or perhaps even discover new issues which warrant further investigation prior to commitment. Such a technique is well suited for use as part of, or in combination with, a software development platform as well as other well as other electronic systems.

While various embodiments of the invention have been particularly shown and described, it will be understood by those skilled in the art that various changes in form and details may be made therein without departing from the spirit and scope of the invention as defined by the appended claims.

For example, the electronic system 20 was described above in the context of a software development platform for illustrative purposes. It should be understood that other applications are possible as well. Such applications for the electronic system 20 may include document drafting platforms, music mixing platforms, movie (video and audio) editing systems, and so on. Along these lines, the techniques disclosed above can be applied to scenarios which involve multiple users tasked with coordinating changes to a common body of work.

Additionally, in some arrangements, the front-end commitment controller 32 of the server device 22 prevents the user who submitted the proposed modification 36 (i.e., the submitter) from making any further changes while the proposed modification 36 is under review. To make further changes in these arrangements, the submitter directs the front-end commitment controller 32 to abort the review process, and the front-end commitment controller 32 responds by sending out new notification messages 40 notifying the reviewers that the submitter has canceled the proposed modification 36. The submitter is then free to submit a new proposed modification 36 and start the review process again in a similar manner.

In other arrangements, the front-end commitment controller 32 is capable of accommodating further changes that the submitter makes while the review is in progress. In one arrangement, the submitter makes a further change and informs the front-end commitment controller 32 to send out new notification messages 40 to the reviewers thereby resetting the review process. In another arrangement, the front-end commitment controller 32 automatically detects when a new change is made, and then sends out new notification messages 40 instructing all reviewers to re-review.

Other "further change" alternatives are suitable as well. For instance, in yet another another arrangement, the front-end commitment controller 32 manages a sequence of review points. That is, after the front-end commitment controller 32 has issued a first set of notification messages 40 to the reviewers to review a first proposed modification 36 (e.g., review point A), the front-end commitment controller 32 can receive a second proposed modification 36 (e.g., review point B). The front-end commitment controller 32 waits until it has received reviews for the first proposed modification 36 (i.e., review point A) before automatically issuing a second set of notification messages 40 to the reviewers to review the second proposed modification 36. The front-end commitment controller 32 allows commitment of the proposed modifications 36 only after it receives an appropriate number of approvals for all outstanding review points.

Furthermore, the front-end commitment controller 32 is capable of concurrently coordinating proposed modifications 36 from multiple users. For example, suppose that User A makes a first proposed modification 36 to a file and directs the front-end commitment controller 32 to send out a first set of notification messages 40 to the reviewers. Then, suppose that User B makes a change to the same file and directs the front-end commitment controller 32 to send out a second set of notification messages 40 to the reviewers. In this situation, User B's file may not include the first proposed modification 36 from User A. Nevertheless, the front-end commitment controller 32 is able to handle this situation by allowing commitment of the first proposed modification 36 by User A once appropriate approvals for the first proposed modification 36 is received. The front-end commitment controller 32 then directs User B to absorb/merge User A's changes into User B's file and then issues a new set of notification messages 40 to the reviewers to review the second proposed modification 36. Such operation treats the second proposed modification 36 by User B as a new review point which is capable of being approved and committed via an updated review.

Additionally, by way of example only, the reviewer database 62 was described above as being separate from the managed storage 68 which holds the stored information 34 (e.g., see FIG. 2). However, in other arrangements, proposed modifications 36 to the reviewer database 62 undergo review and are subject to the approval/rejection process, i.e., i.e., the reviewer database 62 is part of the stored information 34. In these arrangements, when a new file is added and a commit request comes up, the front-end commitment controller 32 sends a request to the submitter to define reviewers. The submitter then identifies a set of reviewers to the front-end commitment controller 32. Along these lines, the submitter may choose reviewers by requesting experts via the electronic system 20, may communicate with potential reviewers out of band, may simply enter names based on his/her own knowledge, etc. The front-end commitment controller 32 then processes the submitter's choices of reviewers using the above-described review process. That is, the reviewer database 62 itself has reviewers (a primary owner, one or more secondary reviewers, and so on) and they must review/approve proposed modifications 36 to the reviewer database 62.

Furthermore, by way of example only, the hierarchy of the information within the reviewer database 62 was described above as being defined by an administrator (e.g., see FIGS. 3 and 4). However, in other arrangements, the reviewer database 62 is capable of inheriting information directly from the stored information 34 in the managed storage 68 (FIG. 2). Along these lines, the hierarchy of the stored information 34 in the managed storage 68 establishes the hierarchy of the entries 80 in the reviewer database 62. That is, the parent/child relationships for the entries 80 logically flows from the stored information 34 due to the inherent correspondence between the entries 80 and the stored information 34 (i.e., the entries 80 simply assume or mimic the relationships from the stored information). Moreover, a reviewer for Directory A is capable of being automatically designated as a reviewer for all subdirectories and all files in Directory A (but not limited to or not excluding others). Such operation enables the reviewer database 62 to be handled as a self-regulated body of stored information 34.

Additionally, it should be understood that the submitter of a proposed modification 36 to a particular data element 102 may be listed in the reviewer database 62 as a reviewer for that data element 102. In some arrangements, the commitment control circuit 60 handles this situation by excluding the submitter as a reviewer.

Furthermore, it was described above that, when the commitment control circuit 60 creates a new entry 80 for a new data element 102 in the reviewer database 62, the commitment control circuit 60 is able to navigate up within the reviewer database 62 to copy the reviewer list from the entry 80 which corresponds to a parent data element 102 of the new data element 102 (see the reviewer fields 88 in FIG. 3). Once the commitment control circuit 60 finds the entry 80 which corresponds to the parent data element 102, the commitment control circuit 60 copies the reviewer list from the entry 80 which corresponds to the parent data element 102 so that the new entry 80 corresponding to the new data element 102 inherits this parent reviewer list. In some arrangements, this feature is recursive in that, if no parent review list is available for the parent data element 102, the commitment control circuit 60 navigates further up the hierarchy to find an inheritable review list. As a result, the new data element 102 is capable of reliably inheriting a higher level reviewer list from a higher level data element 102 (i.e., a parent, a grandparent, and so on).

Additionally, it should be understood that the commitment control circuit 60 offers great flexibility and customization capabilities to the review process. For example, the commitment control circuit 60 is capable of managing a rejection tolerance using the reviewer database 62 (e.g., see the additional info fields 90 in FIG. 3). Along these lines, the commitment control circuit 60 may prevent commitment of a proposed modification 36 as long as there is at least one reviewer who has rejected the proposed modification 36. In such arrangements, the commitment control circuit 60 only allows commitment of the proposed modification 36 only after (i) the submitter has addressed all outstanding rejections so that the reviewers who initially rejected the proposed modification 36 have now removed their rejections (e.g., enabled by an optional setting in the additional info field 90, FIG. 3) and (ii) the appropriate approvals have been received.

In other arrangements, the commitment control circuit 60 allows commitment of the proposed modification 36 provided that the appropriate approvals have been received (e.g., from a designated primary reviewer and other reviewers) regardless of whether there are any rejections from reviewers. In yet other arrangements, commitment control circuit 60 requires all reviewers to review (and perhaps comment on the proposed modification modification 36), and the commitment decision is based on a managed vote (e.g., a ratio of approvals and rejections) thus enabling a certain number of approvals (N) to override one or more rejections. Other scenarios are suitable for use as well.

Additionally, it should be understood that the client devices 24 were described above as including general computerized workstations (e.g., desktop computers, laptops, etc.) which run applications to enable the users to edit. In some arrangements, the client devices 24 may include specialized hardware such as sophisticated special effects and mixing equipment, and so on.

Furthermore, it should be understood that the data elements 102 which are handled by the electronic system 20 were described as electronic files by way of example. In other arrangements, the data elements 102 take other forms such as portions of files, sets of files, audio or video clips, data modules, blocks, etc. For example, in the context of a software development platform, the component IDs may refer to software modules or larger bodies of software having subparts rather than files, and the entries 80 can correspond to these modules. As another example, the commitment control circuit 60 is capable of coordinating approvals for multiple components/files (e.g., by coordinating multiple entries 80 in the reviewer database 62) so that commitment of the proposed changes to the multiple components/files occurs only after appropriate approvals for all components/files are received.

Additionally, it should be understood that the identifiers illustrated above were provided by way of example only. In particular, the values for the component IDs were described above as filenames and/or pathnames, and the user IDs were described above as email addresses. In other arrangements, the IDs take other forms such as unique numerical identifiers, reference IDs received from the data management subsystem 66, character strings, etc.

Furthermore, it should be understood that the reviewer database 62 may operate as a tracking and workflow tool that saves a history of change reviews over time as well as guides testing and release of the particular changes. Along these lines, the additional info fields 90 of the entries 80 (FIG. 3) can be configured to store the change history of the various data elements. Additionally, the additional info fields 90 can define and track particular checks and tests that the data elements must pass before being deemed acceptable (e.g., "demo ready"). Such modifications and enhancements are intended to belong to particular embodiments.

What is claimed is:

1. A method of electronically controlling commitment of a change to stored information, the method comprising:

accessing a reviewer database to ascertain a set of reviewers assigned to review proposed changes to the stored information, the stored information being a portion of source code stored in a source code file, the source code having been previously compiled into operable executable code, the portion of source code being a portion of a software application;

after the set of reviewers is ascertained, electronically notifying the set of reviewers to review a particular proposed change to the stored information, the particular proposed change being constructed and arranged to modify operation of the operable executable code, each reviewer being able to electronically approve or reject the particular proposed change to the stored information in parallel with other reviewers of the set of reviewers for concurrent review coordination of the particular proposed change; and (i) electronically preventing commitment of the particular proposed change to the stored information while less than a predefined number of electronic approvals has been received from the set of reviewers and (ii) electronically enabling commitment of the particular proposed change to the stored information upon receipt of the predefined number of electronic approvals from the set of reviewers;

prior to committing the particular proposed change to the stored information, accessing the reviewer database to ascertain another set of reviewers assigned to review another proposed change to another portion of the source code which has been previously compiled into the operable executable code;

in response to the particular proposed change to the stored information being electronically committed and determining that the particular proposed change and the other proposed change work together, automatically notifying a drafter of the other proposed change to merge the particular proposed change with the other proposed change and then notifying the other set of reviewers to review the other proposed change to the other portion of the source code, each reviewer of the other set of reviewers being able to electronically approve or reject the other proposed change to the stored information in parallel with other reviewers of the other set of reviewers for concurrent review coordination of the other proposed change;

wherein the operable executable code forms a portion of a prior version of an executable application; and wherein the method further comprises, after commitment of the particular proposed change to the stored information is electronically enabled by receipt of the predefined number of electronic approvals from the set of reviewers, compiling and linking the source file along with other source files to generate a new version of the executable application which is different than the prior version of the executable application.

2. A method as in claim 1 wherein the reviewer database includes database entries corresponding to various data components, the stored information being a particular data component; and wherein accessing the reviewer database to ascertain the set of reviewers includes:

receiving an electronic change request from a user, the electronic change request including a particular data component identifier, selecting a particular database entry among the database entries based on the particular data component identifier, and in response to selection of the particular database entry, obtaining an electronic reviewer list which lists the set of reviewers.

3. A method as in claim 2 wherein the electronic reviewer list includes a set of user identifiers which identify respective reviewers of the set of reviewers; and wherein electronically notifying the set of reviewers to review the proposed change to the stored information includes, based on the set of user identifiers, providing separate electronic notifications to the respective reviewers of the set of reviewers.

4. A method as in claim 3 wherein a format for the database entries includes (i) a current data component field for identifying a current data component, (ii) a reviewer list field for listing reviewers of the current data component; and (iii) a parent data component field for identifying a parent data component of the current data component; and wherein the method further comprises populating the database entries of the reviewer database to hierarchically relate the various data components to each other.

5. A method as in claim 4 wherein obtaining the electronic reviewer list in response to selection of the particular database entry includes:

accessing a first database entry corresponding to the particular data component;

when a reviewer list field of the first database entry references a reviewer list, processing contents of the reviewer list field of the first database entry to acquire the electronic reviewer list; and when the reviewer list field of the first database entry does not reference a reviewer list, processing contents of a reviewer list field of a second database entry of the reviewer database to acquire the electronic reviewer list, the second database entry corresponding to a data component which is at a higher level relative to the particular data component.

6. A method as in claim 3 wherein the predefined number of electronic approvals is at least two;

wherein the set of user identifiers of the electronic reviewer list includes at least one primary user identifier which identifies at least one primary reviewer of the particular data component and at least one second user identifier which identifies at least one secondary reviewer of the particular data component; and wherein electronically enabling commitment of the particular proposed change to the stored information upon receipt of the predefined number of electronic approvals from the set of reviewers includes receiving at least one approval from at least one primary reviewer.

7. A method as in claim 3 wherein providing separate electronic notifications to the respective reviewers of the set of reviewers includes:

sending a separate email message to each respective reviewer of the set of reviewers, the separate email messages including a common description of the particular proposed change.

8. A method as in claim 3, further comprising:
providing a web browser interface to receive input from the set of reviewers; and
maintaining a tally of electronic approvals and rejections based on the input from the set of reviewers.

9. A method as in claim 3 wherein electronically preventing commitment and electronically enabling commitment of the particular proposed change includes:
setting an enable/disable parameter to prohibit issuance of a commit command to a back-end application while less than the predefined number of electronic approvals has been received from the set of reviewers and adjusting the enable/disable parameter to allow issuance of the commit command to the back-end application upon receipt of the predefined number of electronic approvals from the set of reviewers.

10. A method as in claim 9 wherein the back-end application is a software development platform;
wherein the various data components are portions of software under development which is stored in a data storage system; and
wherein the method further comprises, after the enable/disable parameter is adjusted to allow issuance of the commit command to the back-end application, providing the commit command to the back-end application to commit the particular proposed change to the software under development which is stored in the data storage system.

11. A method as in claim 1 wherein electronically notifying the set of reviewers to review the particular proposed change to the stored information includes informing the set of reviewers to review a first proposed modification to the source code file from a submitter; and wherein the method further comprises:
after informing the set of reviewers to review the first proposed modification to the source code file from the submitter and prior to electronically enabling commitment, restarting review by re-informing the set of reviewers to review a second proposed modification to the source code file from the submitter.

12. A method as in claim 1 wherein electronically notifying the set of reviewers to review the particular proposed change to the stored information includes informing the set of reviewers to review a first proposed modification to the source code file from a first submitter; and wherein the method further comprises:
after informing the set of reviewers to review the first proposed modification to the source code file from the first submitter, (i) receiving a second proposed modification to the source code file from a second submitter, (ii) receiving the predefined number of electronic approvals from the set of reviewers in response to informing the set of reviewers to review the first proposed modification to the source code file from the first submitter, and then (iii) informing the set of reviewers to review the second proposed modification to the source code file from the second submitter prior to electronically enabling commitment.

13. Apparatus to electronically control commitment of a change to stored information, the apparatus comprising:
a communications interface;
a non-transitory computer readable memory device which stores a reviewer database; and
a control circuit coupled to the communications interface and the non-transitory computer readable memory device, the control circuit being constructed and arranged to:
access the reviewer database stored in the non-transitory computer readable memory device to ascertain a set of reviewers assigned to review proposed changes to the stored information, the stored information being a portion of source code stored in a source code file, the source code having been previously compiled into operable executable code, the portion of source code being a portion of a software application;
after the set of reviewers is ascertained, electronically notify the set of reviewers through the communications interface to review a particular proposed change to the stored information, the particular proposed change being constructed and arranged to modify operation of the operable executable code, each reviewer being able to electronically approve or reject the particular proposed change to the stored information in parallel with other reviewers of the set of reviewers for concurrent review coordination of the particular proposed change, and
(i) electronically prevent commitment of the particular proposed change to the stored information while less than a predefined number of electronic approvals has been received from the set of reviewers and (ii) electronically enable commitment of the particular proposed change to the stored information upon receipt of the predefined number of electronic approvals from the set of reviewers;
prior to committing the particular proposed change to the stored information, access the reviewer database to ascertain another set of reviewers assigned to review another proposed change to another portion of the source code which has been previously compiled into the operable executable code;
in response to the particular proposed change to the stored information being electronically committed and determining that the particular proposed change and the other proposed change work together, automatically notify a drafter of the other proposed change to merge the particular proposed change with the other proposed change and then notify the other set of reviewers to review the other proposed change to the other portion of the source code, each reviewer of the other set of reviewers being able to electronically approve or reject the other proposed change to the stored information in parallel with other reviewers of the other set of reviewers for concurrent review coordination of the other proposed change;
wherein the operable executable code forms a portion of a prior version of an executable application; and
wherein the method further comprises, after commitment of the particular proposed change to the stored information is electronically enabled by receipt of the predefined number of electronic approvals from the set of reviewers, compiling and linking the source file along with other source files to generate a new version of the executable application which is different than the prior version of the executable application.

14. Apparatus as in claim 13 wherein the reviewer database includes database entries corresponding to various data components, the stored information being a particular data component; and wherein the control circuit, when accessing the reviewer database to ascertain the set of reviewers, is constructed and arranged to:

receive an electronic change request from a user, the electronic change request including a particular data component identifier, select a particular database entry among the database entries based on the particular data component identifier, and in response to selection of the particular database entry, obtain an electronic reviewer list which lists the set of reviewers.

15. Apparatus as in claim 14 wherein the electronic reviewer list includes a set of user identifiers which identify respective reviewers of the set of reviewers; and wherein the control circuit, when electronically notifying the set of reviewers to review the proposed change to the stored information, is constructed and arranged to:
based on the set of user identifiers, provide separate electronic notifications to the respective reviewers of the set of reviewers.

16. Apparatus as in claim 15 wherein the control circuit, when electronically preventing commitment and electronically enabling commitment of the particular proposed change, is constructed and arranged to:
set an enable/disable parameter to prohibit issuance of a commit command to a back-end application while less than the predefined number of electronic approvals has been received from the set of reviewers and adjust the enable/disable parameter to allow issuance of the commit command to the back-end application upon receipt of the predefined number of electronic approvals from the set of reviewers.

17. Apparatus as in claim 16 wherein the back-end application is a software development platform;

wherein the various data components are portions of software under development which is stored in a data storage system; and wherein the control circuit is further constructed and arranged to:
after the enable/disable parameter is adjusted to allow issuance of the commit command to the back-end application, provide the commit command to the back-end application to commit the particular proposed change to the software under development which is stored in the data storage system.

18. A computer program product having a non-transitory computer readable storage medium which stores a set of instructions to electronically control commitment of a change to stored information; the set of instructions, when carried out by a computer, causing the computer to:

access a reviewer database to ascertain a set of reviewers assigned to review proposed changes to the stored information, the stored information being a portion of source code stored in a source code file, the source code having been previously compiled into operable executable code, the portion of source code being a portion of a software application;

after the set of reviewers is ascertained, electronically notify the set of reviewers to review a particular proposed change to the stored information, the particular proposed change being constructed and arranged to modify operation of the operable executable code, each reviewer being able to electronically approve or reject the particular proposed change to the stored information in parallel with other reviewers of the set of reviewers for concurrent review coordination of the particular proposed change; and (i) electronically prevent commitment of the particular proposed change to the stored information while less than a predefined number of electronic approvals has been received from the set of reviewers and (ii) electronically enable commitment of the particular proposed change to the stored information upon receipt of the predefined number of electronic approvals from the set of reviewers;

prior to committing the particular proposed change to the stored information, accessing the reviewer database to ascertain another set of reviewers assigned to review another proposed change to another portion of the source code which has been previously compiled into the operable executable code;

in response to the particular proposed change to the stored information being electronically committed and determining that the particular proposed change and the other proposed change work together, automatically notifying a drafter of the other proposed change to merge the particular proposed change with the other proposed change and then notifying the other set of reviewers to review the other proposed change to the other portion of the source code, each reviewer of the other set of reviewers being able to electronically approve or reject the other proposed change to the stored information in parallel with other reviewers of the other set of reviewers for concurrent review coordination of the other proposed change;

wherein the operable executable code forms a portion of a prior version of an executable application; and wherein the method further comprises, after commitment of the particular proposed change to the stored information is electronically enabled by receipt of the predefined number of electronic approvals from the set of reviewers, compiling and linking the source file along with other source files to generate a new version of the executable application which is different than the prior version of the executable application.

19. A computer program product as in claim 18 wherein the reviewer database includes database entries corresponding to various data components, the stored information being a particular data component; and wherein the set of instructions, when causing the computer to access the reviewer database to ascertain the set of reviewers, cause the computer to:

receive an electronic change request from a user, the electronic change request including a particular data component identifier, select a particular database entry among the database entries based on the particular data component identifier, and in response to selection of the particular database entry, obtain an electronic reviewer list which lists the set of reviewers.

20. A computer program product as in claim 19 wherein the electronic reviewer list includes a set of user identifiers which identify respective reviewers of the set of reviewers; and wherein the set of instructions, when causing the computer to electronically notify the set of reviewers to review the proposed change to the stored information, cause the computer to, based on the set of user identifiers, provide separate electronic notifications to the respective reviewers of the set of reviewers.

21. A computer program product as in claim 20 wherein the set of instructions, when causing the computer to electronically prevent commitment and electronically enabling commitment of the particular proposed change, cause the computer to:

set an enable/disable parameter to prohibit issuance of a commit command to a back-end application while less than the predefined number of electronic approvals has been received from the set of reviewers and adjust the enable/disable parameter to allow issuance of the commit command to the back-end application upon receipt of the predefined number of electronic approvals from the set of reviewers.

22. A computer program product as in claim 21 wherein the back-end application is a software development platform;

wherein the various data components are portions of software under development which is stored in a data storage system; and wherein the set of instructions further cause the computer to, after the enable/disable parameter is adjusted to allow issuance of the commit command to the back-end application, provide the commit command to the back-end application to commit the particular proposed change to the software under development which is stored in the data storage system.

23. A method as in claim 1 wherein accessing a reviewer database to ascertain a set of reviewers assigned to review proposed changes to the stored information further comprises accessing a set of concurrent proposed modifications from multiple users to a file and coordinating commitment approval review of the set of concurrent proposed changes by accessing the reviewer database to ascertain multiple sets of reviewers.

24. A method as in claim 23 wherein each one of the multiple sets of reviewers is selected to review one of the set of concurrent proposed modifications.

* * * * *